United States Patent [19]
Tsuboi

[11] Patent Number: 5,682,564
[45] Date of Patent: Oct. 28, 1997

[54] VIEWFINDER DEVICE WITH LIGHT DEFLECTING FEATURE FOR CHANGING THE FIELD OF VIEW

[75] Inventor: Takayuki Tsuboi, Kanagawa-ken, Japan

[73] Assignee: Canon Kabushiki Kaisha, Tokyo, Japan

[21] Appl. No.: 385,379

[22] Filed: Feb. 7, 1995

Related U.S. Application Data

[63] Continuation of Ser. No. 53,671, Apr. 29, 1993, abandoned.

[30] Foreign Application Priority Data

May 15, 1992 [JP] Japan ................... 4-148570

[51] Int. Cl.⁶ .................................................. G03B 13/10
[52] U.S. Cl. ................................... 396/378; 396/386
[58] Field of Search ......................... 354/221, 222, 354/224, 225, 164, 166, 195.1, 195.12, 201; 359/431; 358/224, 225; 396/373, 378, 379, 380, 381, 384, 385, 386

[56] References Cited

U.S. PATENT DOCUMENTS

| | | |
|---|---|---|
| 4,478,493 | 10/1984 | Yokota ........................... 354/164 X |
| 5,194,886 | 3/1993 | Mukai et al. ..................... 354/222 |

FOREIGN PATENT DOCUMENTS

1040363  10/1958  Germany ..................... 354/225

*Primary Examiner*—Howard B. Blankenship
*Attorney, Agent, or Firm*—Fitzpatrick, Cella, Harper & Scinto

[57] ABSTRACT

A viewfinder device is arranged to have a pair of light deflecting members disposed in front and in rear of an objective lens, to drive the front light deflecting member to guide light of a left side area of a field of view and light of a right side area of the field of view alternately to the objective lens, and to drive the rear light deflecting member to guide light fluxes thus obtained from the objective lens alternately to the eye of a person taking a sight of the field of view. This arrangement enables the viewfinder device to make a wide range of field sightable and yet permits a reduction in size of the objective lens.

14 Claims, 13 Drawing Sheets

VIEWFINDER DEVICE WITH LIGHT DEFLECTING FEATURE FOR CHANGING THE FIELD OF VIEW

This application is a continuation of prior application Ser. No. 08/053,671 filed on Apr. 29, 1993, now abandoned.

BACKGROUND OF THE INVENTION

1. Field of the Invention

This invention relates to a viewfinder device for an optical apparatus and more particularly to a viewfinder device adapted for an optical apparatus such as a photographic camera using a 35 mm film or a so-called electronic camera using a camera tube or a solid-state image pickup element such as a CCD or the like.

2. Description of the Related Art

The aspect ratio of the pickup image plane of a photographic camera is the same as that of an image printed on a photographic paper in general. The aspect ratio is, for example, 3:2. However, various cameras of the kind having a so-called panorama shooting mechanism for obtaining a wider image of aspect ratio of, say, 2:1 or 3:1, have recently been proposed. The photographic camera of this kind is provided with a so-called trimming shooting mechanism which is arranged to permit taking a shot with a pickup-image-plane trimming extent known beforehand. A panorama picture is obtained by taking a shot with vertical portions of a shooting area shielded from light by means of a mask, and, after a development process, by enlarging the shot to a desired size in printing it on a photographic paper. To enable the camera operator to accurately know the shooting area in the event of a panorama shot, the photographic camera having the panorama shooting mechanism is arranged to adjust the visual field of its viewfinder with a mask by shielding from light some given area vertically located within the visual field of the viewfinder.

In the case of the photographic camera of the kind using a lens shutter and called a compact camera, the viewfinder system is often arranged to have its own optical path independently of a photo-taking lens. If the photo-taking lens of such a compact camera is a zoom lens, the camera is arranged to have a variable-power viewfinder system arranged to vary the magnifying power or rate of the viewfinder in association with a power varying operation on the photo-taking lens. With the compact camera arranged in this manner, if the aspect ratio of the visual field of its viewfinder is changed to a great extent by using a mask in taking a panorama shot, the magnifying rate of the viewfinder becomes too low for an enlarged printed image obtained by trimming. The low magnifying rate of the viewfinder then makes it difficult to imagine a printed picture resulting from the shot.

Further, in a case where the width and the height of the viewfinder (visual) field of a viewfinder device differ from each other, as in the case of a camera which uses a 35 mm film and has an aspect ratio of 3:2, the viewfinder device is designed to have an image circle in a size which includes the diagonal parts of the viewfinder field. The size of the viewfinder device, therefore, tends to increase. Further, in taking a sight of a field of view with the aspect ratio of the viewfinder field changed by means of a panorama shooting mechanism, the viewfinder field is limited by a mask in relation to a shooting area. In that case, therefore, an area which is not used for the viewfinder field within a volume occupied by the optical system of the viewfinder increases. The increase in the unused area causes an increase in wasteful space and thus has presented a problem as the size of the object image obtainable becomes smaller (a small field magnifying rate) to make sighting difficult.

Generally, in a case where a panorama shot taken by using the panorama shooting mechanism is to be printed at a magnifying rate which is approximately two times as large as a magnifying rate employed for an image obtained by ordinary shooting, it is desirable to double the magnifying power of the viewfinder for the purpose of enabling the photographer to adequately grasp the finished state of a picture to be taken.

SUMMARY OF THE INVENTION

It is a first object of this invention to provide a viewfinder device which permits confirmation of a wide-ranged visual field and yet is arranged to permit a reduction in size of the device.

It is a second object of this invention to provide a viewfinder device adapted for a camera which is arranged to permit spurious telephoto shooting.

To attain these objects, a viewfinder device for a camera arranged according to this invention comprises first and second light deflecting means arranged respectively on light entrance and exit sides of an objective lens of a viewfinder of the camera to deflect an incident light flux. The device is arranged such that a visual field of the viewfinder can be enlarged in one direction by adequately driving the first and second light deflecting means to permit taking a sight of a viewfinder image by varying the aspect ratio of the visual field of the viewfinder, for example, in taking a panorama shot.

These and other objects and features of this invention will become apparent from the following detailed description of embodiments thereof taken in connection with the accompanying drawings.

DETAILED DESCRIPTION OF THE PREFERRED EMBODIMENTS

Figure 1:
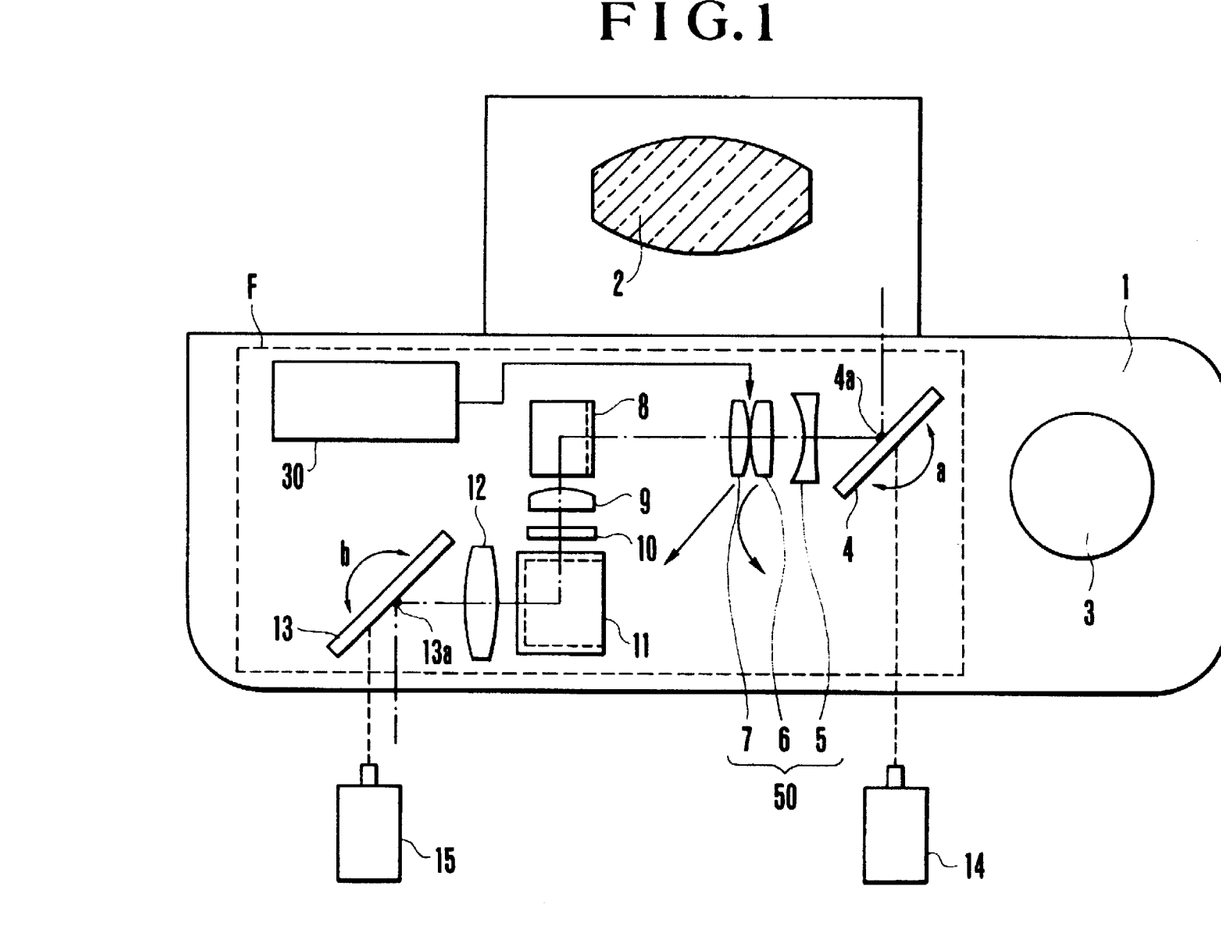
FIG. 1 shows in outline the essential parts of a first embodiment of this invention.
Figure 2:
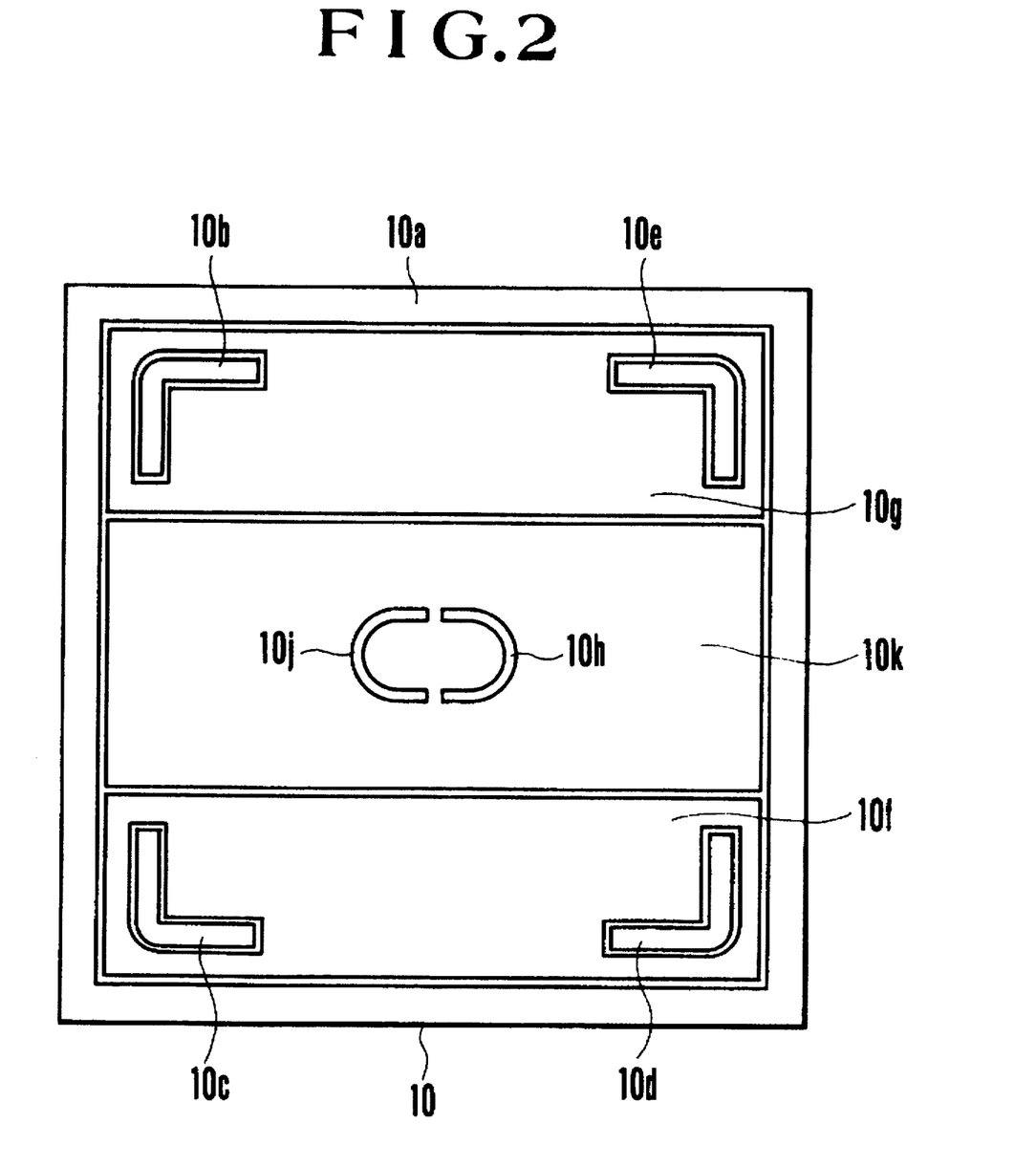
FIG. 2 shows the segments of a liquid crystal device shown in FIG. 1.

FIG. 1 shows in outline the essential parts of a first embodiment, wherein a viewfinder device according to this invention is applied to a compact camera using a 35 mm film. FIG. 2 shows the inside of the visual field of the viewfinder of this embodiment.

Referring to these drawings, a photo-taking lens 2 is disposed on a camera body 1. The photo-taking lens 2 is expediently shown as a single lens. In actuality, however, the lens 2 has a plurality of lens units which are movable for zooming. Reference numeral 3 denotes a shutter release button. Reference symbol F denotes the viewfinder device. In this case, the viewfinder device F is arranged in an upper part of the camera body 1 independently of a photo-taking optical path which extends through the photo-taking lens 2.

The essential parts of the viewfinder device F are arranged as follows: A first mirror 4 is arranged to be swingable in the directions of arrow "a" on a shaft 4a which is provided perpendicular to the paper surface of the drawing. The first mirror 4 is connected to a motor 14 through a reduction gear which is not shown. The first mirror 4 is thus arranged to intermittently scan an object in one direction and to guide a light flux coming from the object to an objective lens unit 50 of a viewfinder system. The motor 14, the first mirror 4 and the reduction gear jointly form one element of a first light deflecting means.

The magnifying power of the objective lens unit 50 is arranged to be variable. The objective lens unit 50 consists of a fixed lens 5 and moving lenses 6 and 7 which are movable on an optical axis for varying the magnifying power. A zoom driving device 30 is arranged to move these lenses 6 and 7 independently of each other along loci as represented by arrows in the drawing. Further, the magnifying power of the photo-taking lens 2 is also arranged to be variable by the zoom driving device 30 in the same manner as that of the viewfinder system.

A prism 8 is arranged to bend an optical path by reflecting twice the light flux which has passed through the objective lens unit 50. Reference numeral 9 denotes a field lens. A liquid crystal device (hereinafter referred to as LCD) 10 which serves as shutter means is disposed in the neighborhood of a primary image forming plane on which the image of an object to be photographed (object image), i.e. a realings, is formed by the objective lens unit 50. It is preferable that the LCD 10 is made of a liquid crystal having a high contrast ratio, such as P.D.L.C. (Polymer-Dispersed Liquid Crystal) made by Asahi Glass Co., Ltd. The LCD 10 consists of segments 10a to 10k as shown in FIG. 2. Each of the segments is arranged to be individually drivable for a display. Reference numeral 11 denotes a prism and reference numeral 12 denotes an eyepiece. The light flux from the object image formed on the primary image forming plane comes to the eyepiece 12 after it is reflected twice by the prism 11. A second mirror 13 is arranged to be swingable in the directions of arrow "b" on a shaft 13a which extends perpendicular to the paper surface of the drawing. The second mirror 13 is connected to a motor 15 through a reduction gear which is not shown. The second mirror 13, the reduction gear and the motor 15 jointly form one element of second light deflecting means.

In the case of this embodiment, the object area is divided into right and left areas by the first light deflecting means. Light fluxes from the right and left areas thus divided are arranged to be alternately guided to the objective lens unit 50. The light from the right divided area or from the left divided area is imaged on the primary image forming plane by the objective lens unit 50. Then, the object image of the right divided area or that of the left divided area is allowed to be incident on the eye of a sight-taking person through the eyepiece 12 by driving the second light deflecting means, in synchronism with the deflecting action of the first light deflecting means, to deflect the object image to the right or left area of the visual field of the viewfinder. The device makes a viewfinder image sightable in this manner.

At this time, each of the segments 10a to 10k of the liquid crystal device (LCD) 10 shown in FIG. 2 is driven in synchronism with the deflecting actions of the first and second light deflecting means, as will be described later, and comes into a state of blocking light in such a way as to display a viewfinder field frame.

Figure 3A:
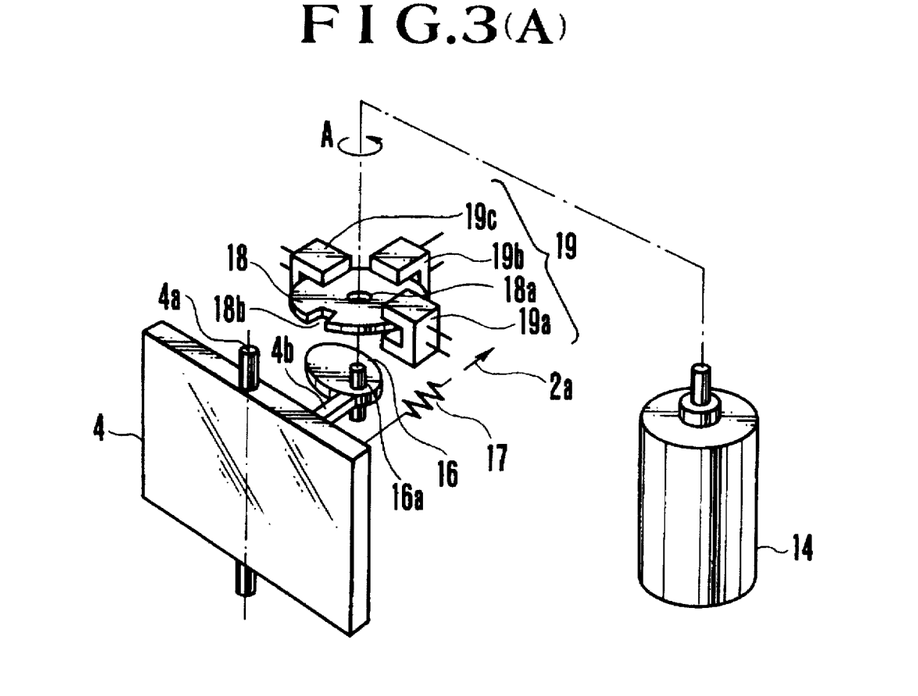
FIGS. 3(A) and 3(B) are enlarged views showing photo-interrupter detecting devices shown in FIG. 1.
Figure 3B:
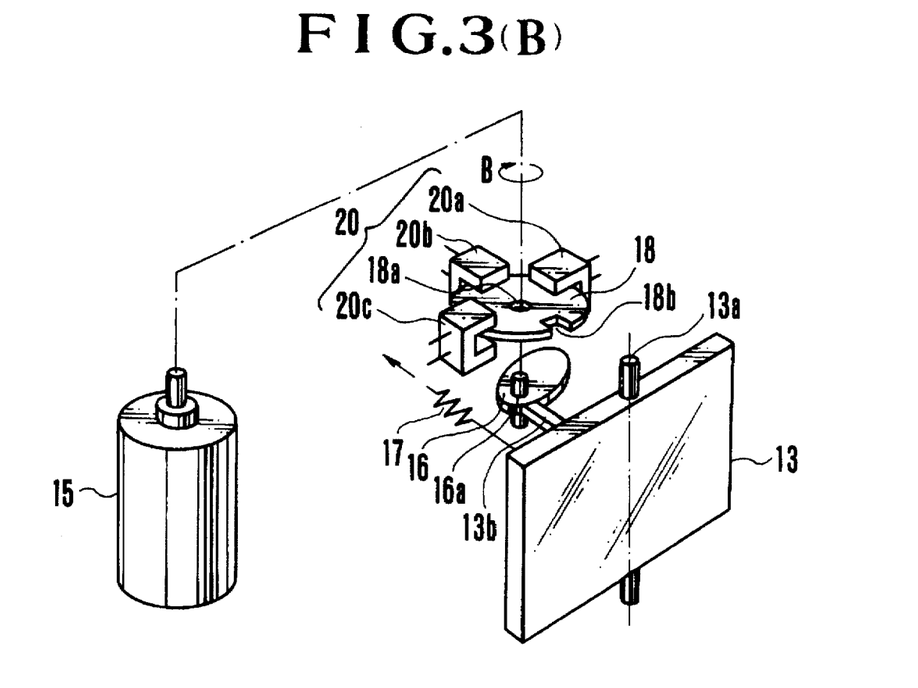

FIGS. 3(A) and 3(B) are enlarged views showing detecting devices which are respectively arranged to detect the positions of the first and second mirrors 4 and 13 shown in FIG. 1. Referring to FIG. 3(A), the first mirror 4 is carried by a viewfinder body (not shown) in such a way as to be swingable on the shaft 4a. A spring 17 is arranged to urge the first mirror 4 to move in the direction of arrow 2a. A cam follower 4b which is provided on the reverse side of the reflection surface of the first mirror 4 abuts on a cam 16.

The cam 16 is connected to the motor 14 through a reduction gear and is formed in one body with a pulse plate 18 with its shaft 16a rotatably carried. The pulse plate 18 has a notch part 18b formed in a position which corresponds to a neutral position of the cam 16. Reference numeral 19 denotes a photo-interrupter detecting device (hereinafter referred to as PI detecting device).

The PI detecting device 19 consists of detecting parts (PI parts) 19a, 19b and 19c which are arranged along the periphery of the pulse plate 18 to detect the position of the notch part 18b through a change taking place in a light-passing state for the purpose of detecting the positions of the cam 16 and the pulse plate 18. The PI detecting device 19 outputs a phase signal indicating a phase $\phi 0$ when the pulse plate 18 is in an initial position where the notch part 18b is not at any of the PI parts 19a, 19b and 19c. When the notch part 18b comes to one of the PI parts 19a, 19b and 19c, the PI detecting device 19 outputs a phase signal indicating a phase $\phi 1$, $\phi 2$ or $\phi 3$. Therefore, in a case where the phase signals are outputted in the order of phases $\phi 1 - \phi 2 - \phi 3$, the cam 16 is rotating in the direction of arrow A.

Referring to FIG. 3(B), another PI detecting device 20 is arranged to detect the position of the second mirror 13 in the same manner as the PI detecting device 19. When a cam 16 is rotated by the motor 15 in the direction of arrow B, which is reverse to the direction of arrow A shown in FIG. 3(A), the PI detecting device 20 outputs phase signals in the order of $\phi 3 - \phi 2 - \phi 1$.

Figure 4:
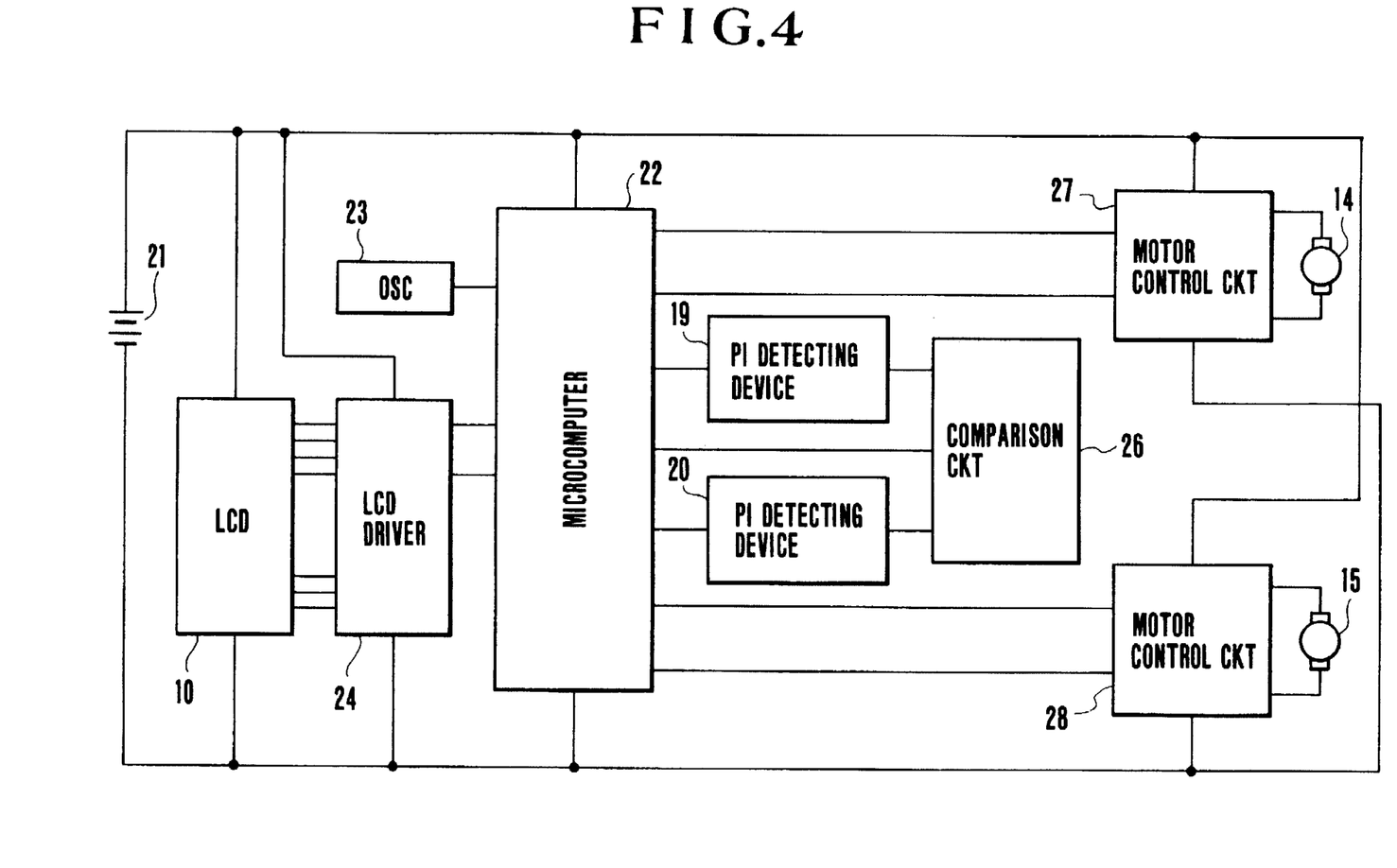
FIG. 4 is a block diagram showing the driving control means of the first embodiment of this invention.

FIG. 4 is a block diagram showing driving control means for driving the first and second light deflecting means and the liquid crystal device (LCD) 10 in synchronism with each other. In FIG. 4, reference numeral 21 denotes a power supply. An LCD driver 24 is arranged to drive the LCD 10, which is arranged to allow light to be transmitted with a voltage applied to each of its segments. The illustration includes the PI detecting devices 19 and 20 which are arranged to detect the position of the first mirror 4 and that of the second mirror 13, a comparison circuit 26 which is arranged to compare the phase signal outputs of the PI detecting devices 19 and 20 with each other and to supply a phase deviation signal to a microcomputer 22, the microcomputer 22 which is arranged to perform an arithmetic process on the basis of the phase deviation signal, and motor control circuits 27 and 28 which include transistor bridges and are arranged in a known manner. With the phase deviation signal from the comparison circuit 26 arithmetically processed by the microcomputer 22, the motor control circuits 27 and 28 respectively drive the motors 14 and 15 at an apposite duty ratio in such a way as to have the motors 14 and 15 perfectly synchronized with each other.

Figure 5:
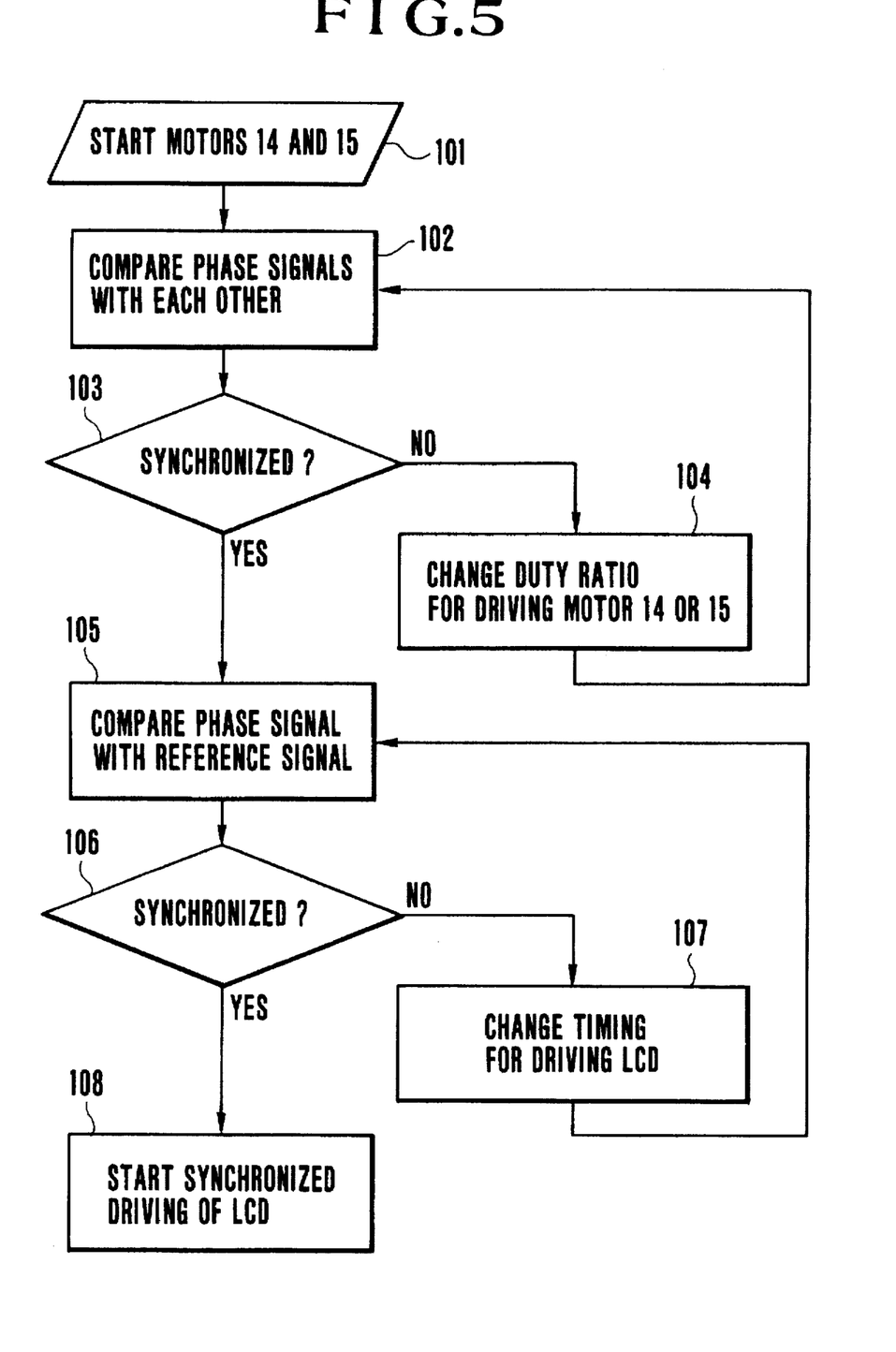
FIG. 5 is a flowchart showing the operation of the first embodiment to be performed for initial setting.

FIG. 5 is a flowchart. With the embodiment arranged as described above, an operation performed after the power supply of the camera body is turned on to start driving the various elements and until they are synchronized will be next described with reference to FIG. 5 as follows:

At a step 101, the motors 14 and 15 are started after the main switch of the camera is found to have been turned on or when the photographer has readied the camera for shooting by holding it in a shooting posture. At a step 102, the phase signals from the PI detecting devices 19 and 20 are compared with each other by the comparison circuit 26. At a step 103, if the phase signals are found to be deviating from each other, information on the amount of the phase deviation is supplied to the microcomputer 22.

At a step 104, the microcomputer 22 changes the driving duty ratio of the motor control circuits 27 and 28 according to the amount of the phase deviation and thus performs control to make the amount of the phase deviation zero.

At a step 105, the phase signal is compared with a reference LCD driving signal for determining the timing of driving each segment of the liquid crystal device 10. At a step 106, if the timing is found to be deviating, the flow of operation comes to a step 107. At the step 107, the reference LCD driving signal is changed. A synchronizing action is thus repeated by the steps 105, 106 and 107 until a synchronized state is obtained.

At a step 108, each of the segments 10a to 10k of the liquid crystal device 10 is driven on the basis of the reference LCD driving signal at the driving timing which will be described later herein.

Figure 6A:
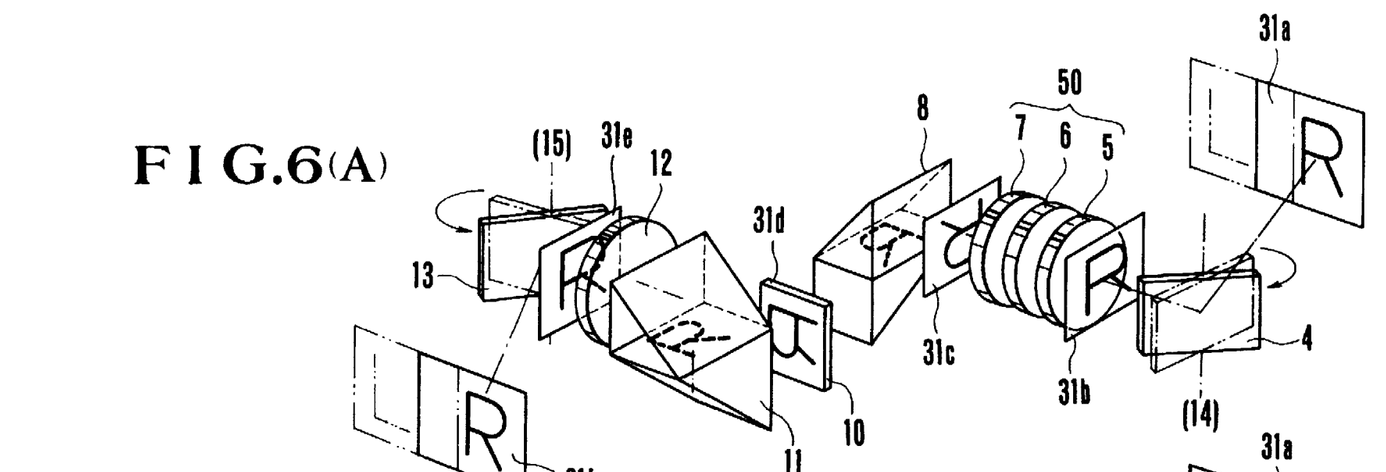
FIGS. 6(A) and 6(B) are oblique views showing the essential parts of the first embodiment.
Figure 6B:
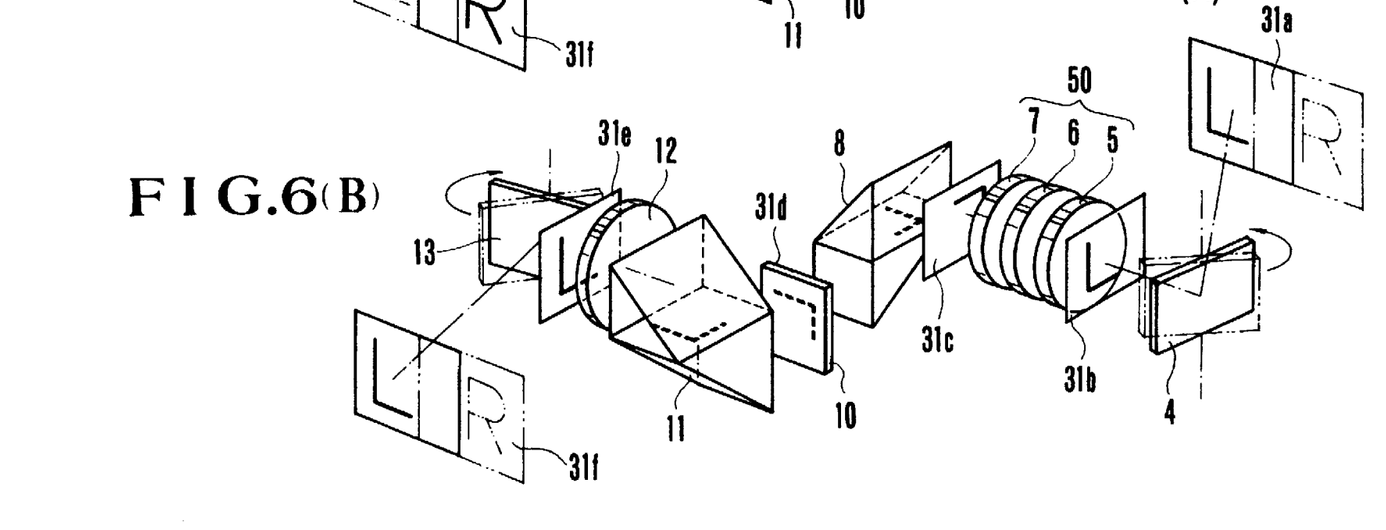

FIGS. 6(A) and 6(B) are oblique views mainly showing essential parts which form an optical path of the viewfinder device shown in FIG. 1. The switching of the object image based on the light flux which comes from the object to be photographed and is divided and scanned by the first mirror 4 will be described below.

FIG. 6(A) shows a state in which the right area of the object is caught by the first mirror 4. FIG. 6(B) shows a state in which the left area of the object is caught by the first mirror 4.

Referring to FIG. 6(A), the first mirror 4 is located at a position where the signal of the phase $\phi1$ is outputted from the PI detecting device 19 shown in FIG. 3(A). A light flux from the right side part "R" of the object 31a (L, R) is guided to the objective lens unit 50 by the first mirror 4. At this time, the object image is first reflected by the first mirror 4 and made into a reversed image (31b) with its right and left sides reversed. When the light flux passes through the objective lens unit 50, the upper, lower, right and left sides of the object image are further reversed to make the image into an inverted image (31c). Next, the light flux is reflected twice by the prism 8 to form an image (31d) on the primary image forming plane. The light flux is further reflected twice by the prism 11 and is thus made into an erecting reversed image (31e). The erecting reversed image is reflected by the second mirror 13 and thus becomes an erect non-reversed image (31f), which can be seen on the right side area of the visual field of the viewfinder.

In the case of FIG. 6(B), the first mirror 4 is located at a position where the signal of the phase $\phi3$ is outputted from the PI detecting device 19 shown in FIG. 3(A). A light flux from the left side part "L" of the object image 31a (L, R) is guided to the objective lens unit 50 by the first mirror 4. Like the light flux from the right side area "R", the light flux from the left side area "L" goes through the objective lens unit 50 and the prisms 8 and 11 to be deflected and reflected to the left side area of the visual field of the viewfinder by the second mirror 13.

Therefore, in sighting the right side part "R" of the object, the first mirror 4 is swung in the direction of an arrow as shown in FIG. 6(A). Meanwhile, the second mirror 13 is also swung in the direction of an arrow in synchronism with the first mirror 4.

Figure 7A:
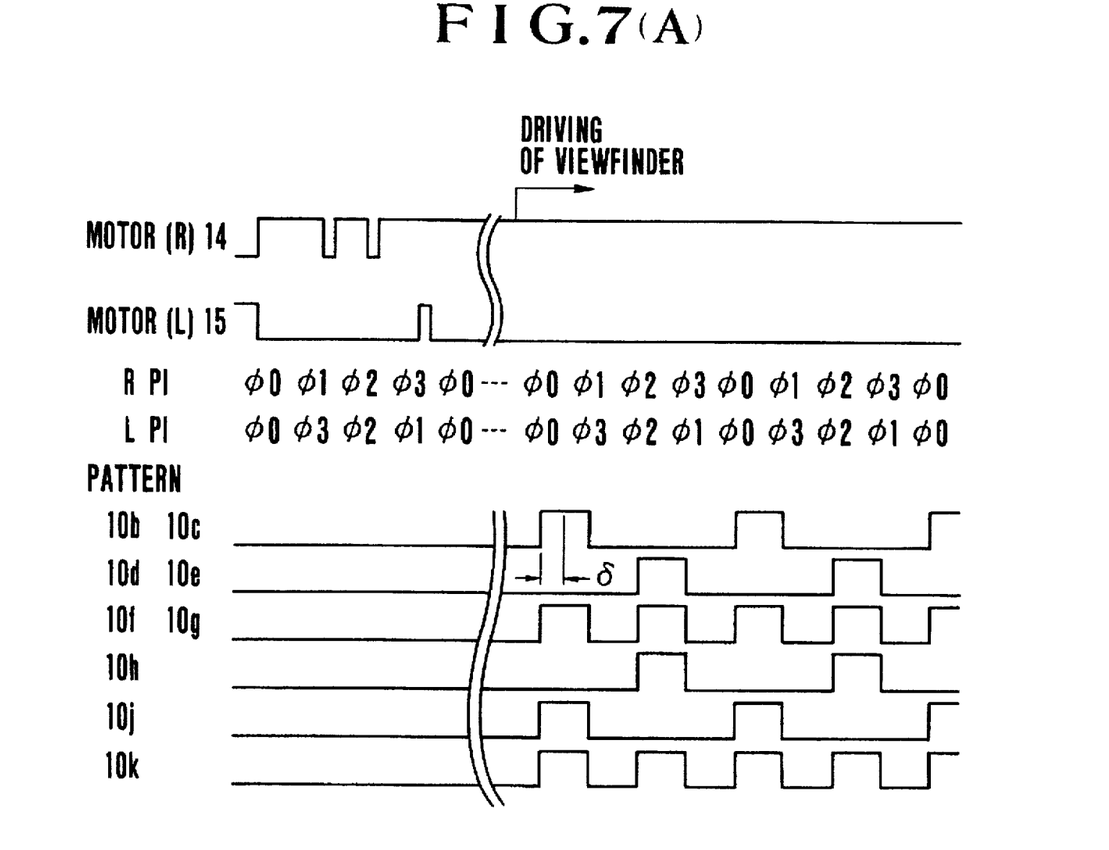
FIGS. 7(A) and 7(B) show the driving timing for an ordinary shooting operation of the first embodiment.
Figure 7B:
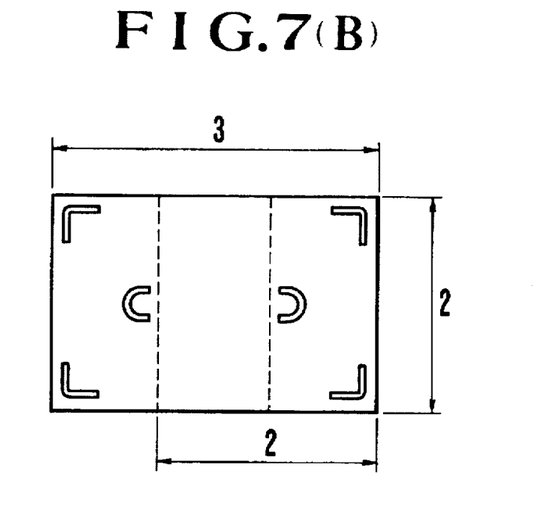

The timing of driving each element in the arrangement described above will be described below with reference to FIG. 7(A) which is a timing chart.

Upon detection of a preparatory action taken by the photographer, such as holding the camera for shooting, etc., a trigger signal is supplied to the microcomputer 22. Then, as described above, the motors 14 and 15 begin their driving actions. The motor 14 rotates in the direction of phases $\phi0$-$\phi1$-$\phi2$-$\phi3$ and the motor 15 in the direction of phases $\phi0$-$\phi3$-$\phi2$-$\phi1$, respectively.

Then, as described above with reference to FIG. 5, a synchronizing action is carried out by changing the driving duty ratio for the motor 14 or 15. After that, the liquid crystal device 10 is driven in synchronism with the phase signals coming from the PI detecting devices 19 and 20 (in actuality, ahead of the phases of these phase signals as much as the amount of delay $\delta$ in the action of the liquid crystal (LCD)).

When the output of the PI detecting device 19 is indicating the phase $\phi1$ and that of the other PI detecting device 20 is indicating the phase $\phi3$, that is, when the right side area of the object is sighted, only the segments 10d, 10e and 10h among the LCD segments shown in FIG. 2 are opaque and are displayed as black lines. Meanwhile, a voltage is applied to other segments to cause them to be in a transparent state.

Next, when the phases of the motors 14 and 15 advance to the phase $\phi2$ which corresponds to a lift part of the cam 16, each of the segments is released from the voltage to become opaque. These segments thus serve to give a shutter-like effect. With the phase of the PI detecting device 19 further advanced to the phase $\phi3$ and that of the PI detecting device to the phase $\phi1$, that is, when there is obtained a state of sighting the left side area of the object, the segments 10b, 10c and 10j alone become opaque to be displayed as black lines. In the meantime, other segments are caused to become transparent with a voltage applied to them.

These segments which are arranged to be driven at the timing mentioned above are driven at a frequency which is at least 30 Hz and preferably above 60 Hz. This driving arrangement enables the photographer to sight the visual field of the viewfinder of an aspect ratio of 3:2 suitable for a 35 mm film camera, as shown in FIG. 7(A), without any flicker through the viewfinder system.

Figure 8A:
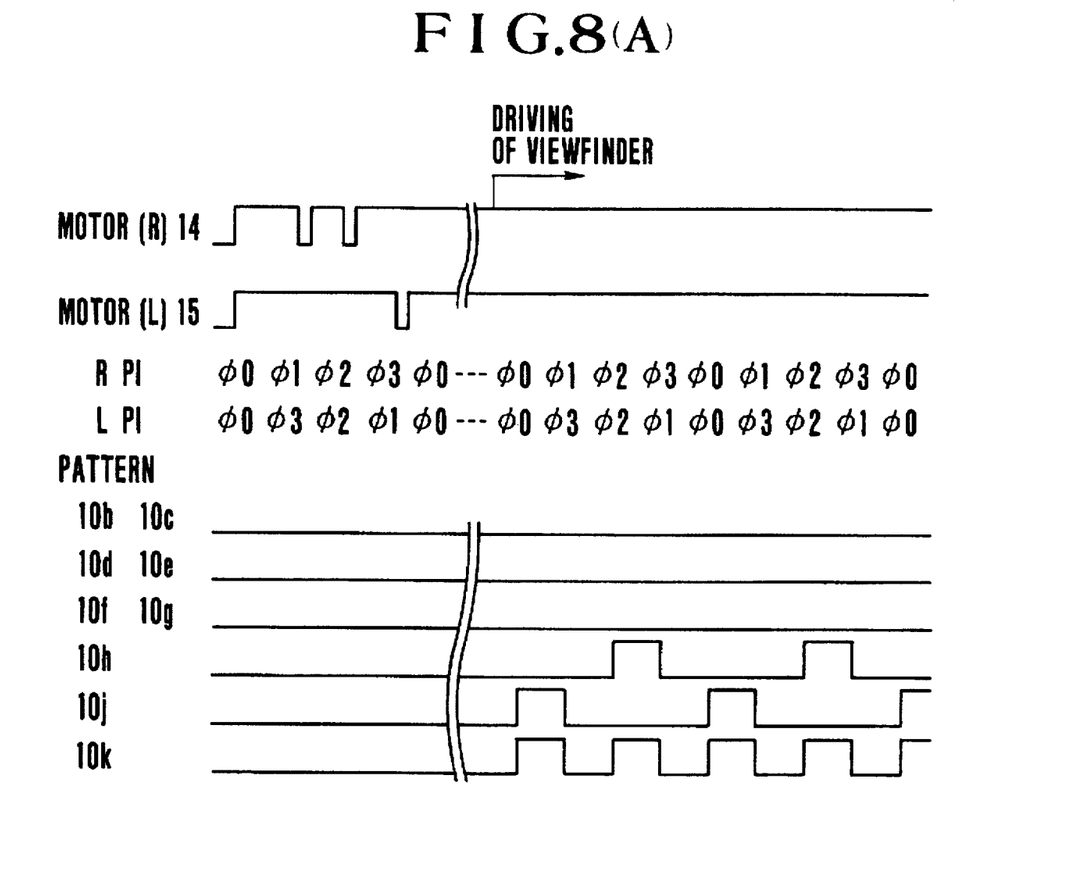
FIGS. 8(A) and 8(B) show the driving timing for a panorama shooting operation of the first embodiment.
Figure 8B:
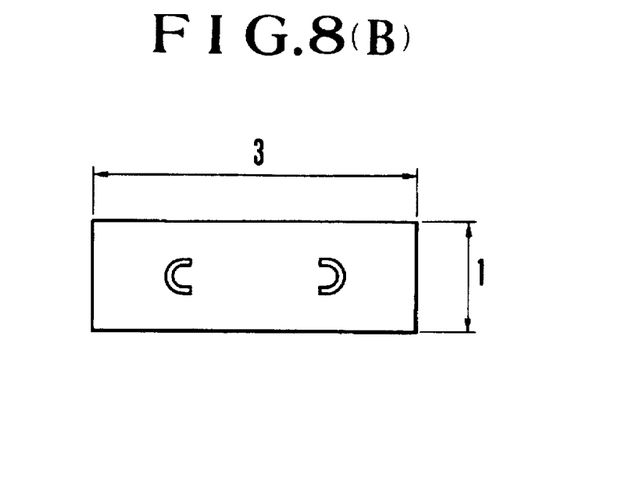

FIG. 8(A) is a timing chart showing the timing of the operation of the embodiment performed when the shooting mode of the camera is changed over to a panorama shot mode. This timing chart differs from the timing chart of FIG. 7(A) in that both a frame pattern which is formed by the segments 10b, 10c, 10d and 10e and a panorama pattern which is formed by the segments 10f and 10g are in an off-state (in a non-transparent state). By virtue of this arrangement, a viewfinder visual field corresponding to the image plane size for a panorama shot as shown in FIG. 8(B) can be obtained with a simple arrangement by shielding from light the upper and lower parts of the normal viewfinder visual field.

This first embodiment has a small optical path within the viewfinder system in a square shape of aspect ratio of 1:1 and yet is capable of giving a large visual field of the viewfinder having the aspect ratio of 3:2 or 3:1.

Further, the movable mirrors employed as light deflecting means may be arranged to be swung by bimorph cell means using piezoelectric elements.

Figures 9A, 9B:
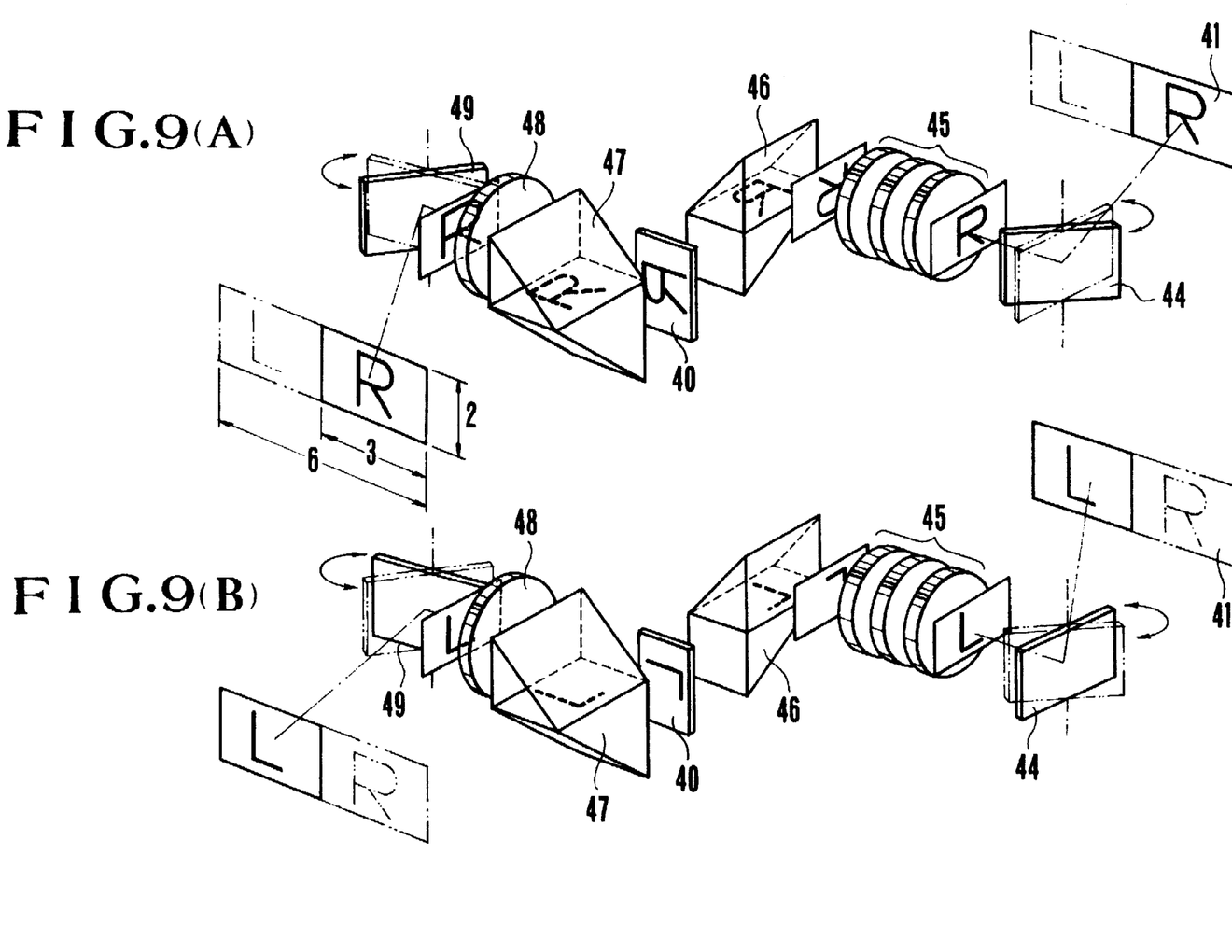
FIGS. 9(A) and 9(B) are oblique view showing the essential parts of a second embodiment of this invention.

FIGS. 9(A) and 9(B) show in oblique views the essential optical parts of a viewfinder device which is arranged as a second embodiment of this invention. FIG. 9(A) shows the viewfinder system in a state in which the right side area of an object to be photographed is reflected by a first mirror 44. FIG. 9(B) shows the viewfinder system in a state in which the left side area of the object is reflected by the first mirror 44.

The viewfinder device arranged as the second embodiment of the invention is similar to the first embodiment shown in FIGS. 1, 6(A) and 6(B). However, the second embodiment differs from the first embodiment in that the aspect ratio of the optical path within the viewfinder device is arranged to be 3:2 instead of the optical path aspect ratio 1:1 of the first embodiment. Further, in the case of the second embodiment, the camera is assumed to be arranged to vary the magnifying power of the viewfinder system independently of the magnifying power of a photo-taking lens system.

Figure 10:
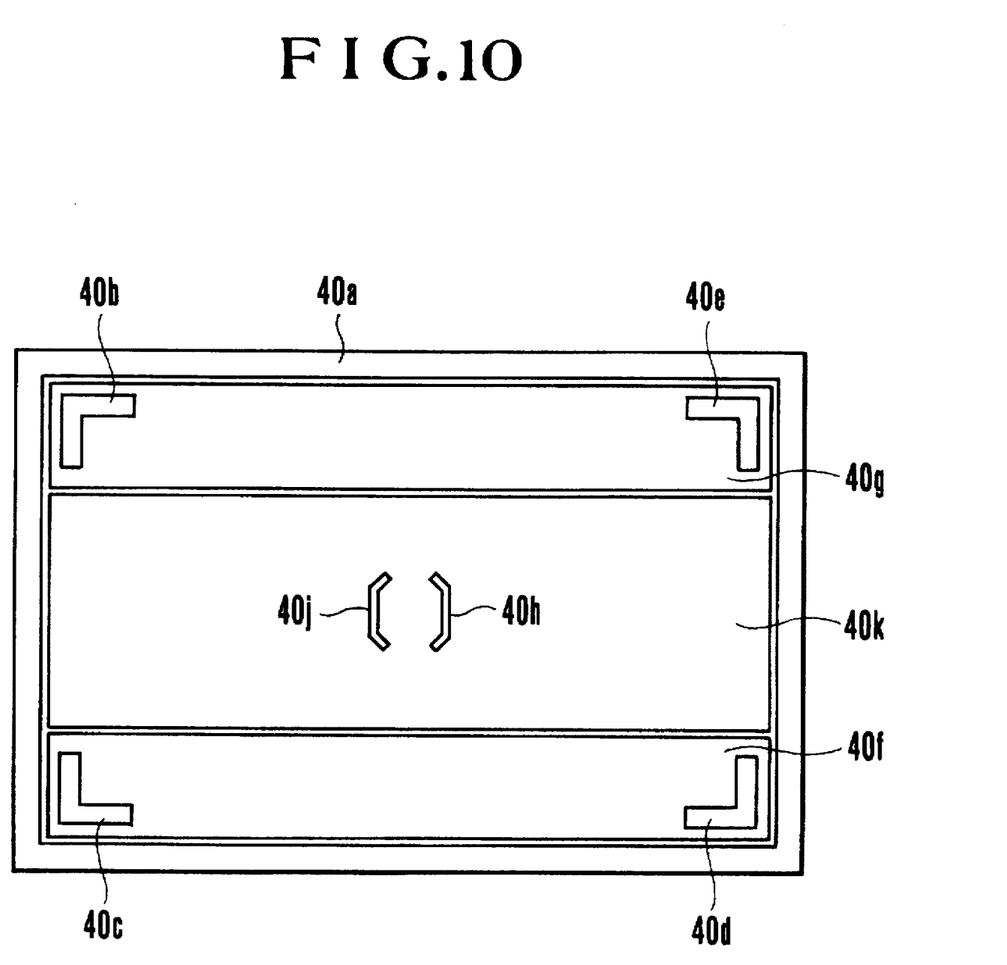
FIG. 10 shows the segments of the liquid crystal device shown in FIGS. 9(A) and 9(B).

In FIGS. 9(A) and 9(B), reference numeral 41 denotes an object to be photographed. These illustrations include the first mirror 44 which is arranged as one element of first light deflecting means, an objective lens unit 45 which is provided with magnifying power varying means, prisms 46 and 47, a liquid crystal device 40 which is disposed near a primary image forming plane and serves as shutter means, the details of which are shown in FIG. 10, an eyepiece 48, and a second mirror 49 which is arranged as one element of second light deflecting means.

Figure 11:
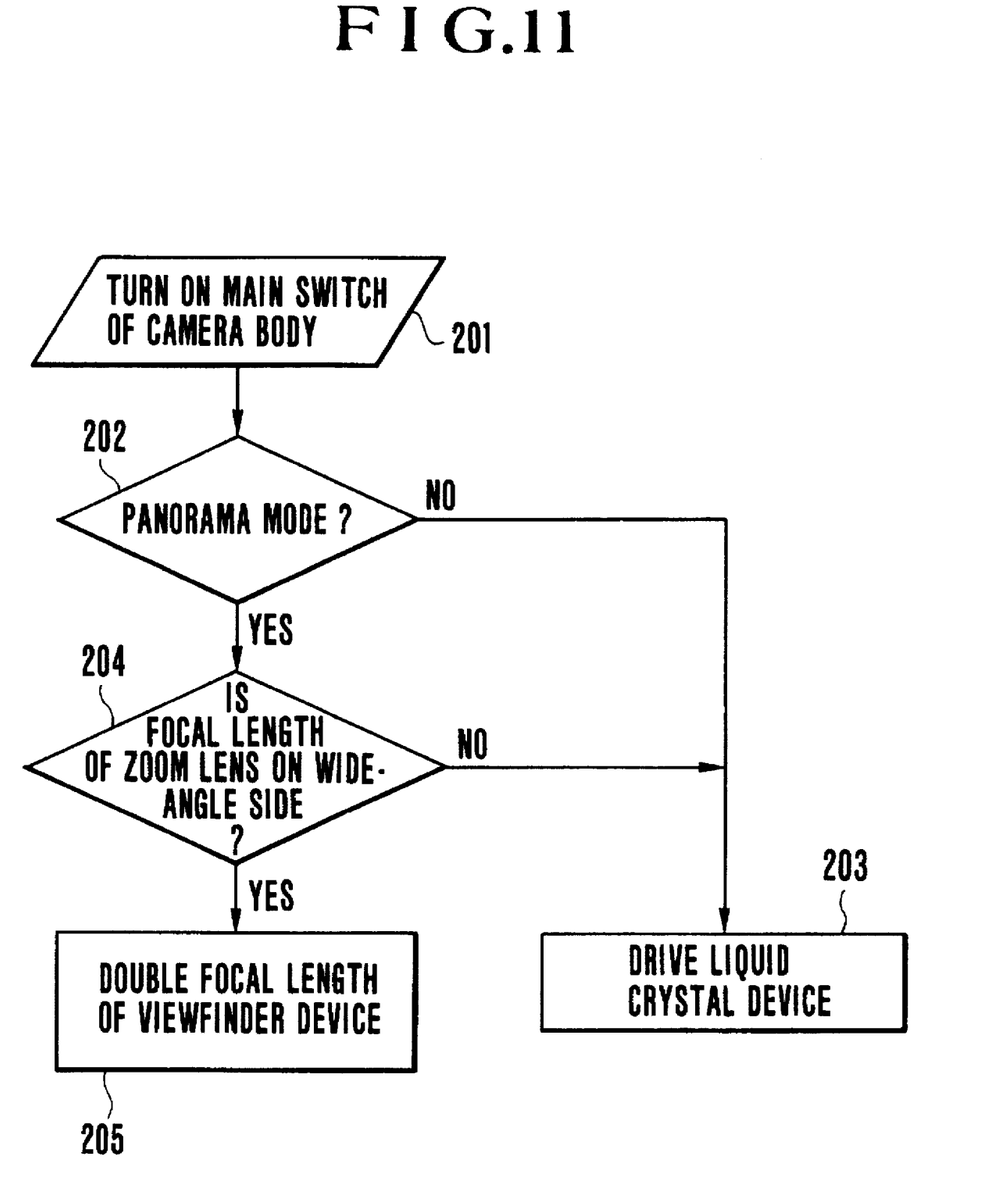
FIG. 11 is a flowchart showing the operation of the second embodiment to be performed for initial setting.
Figure 12A:
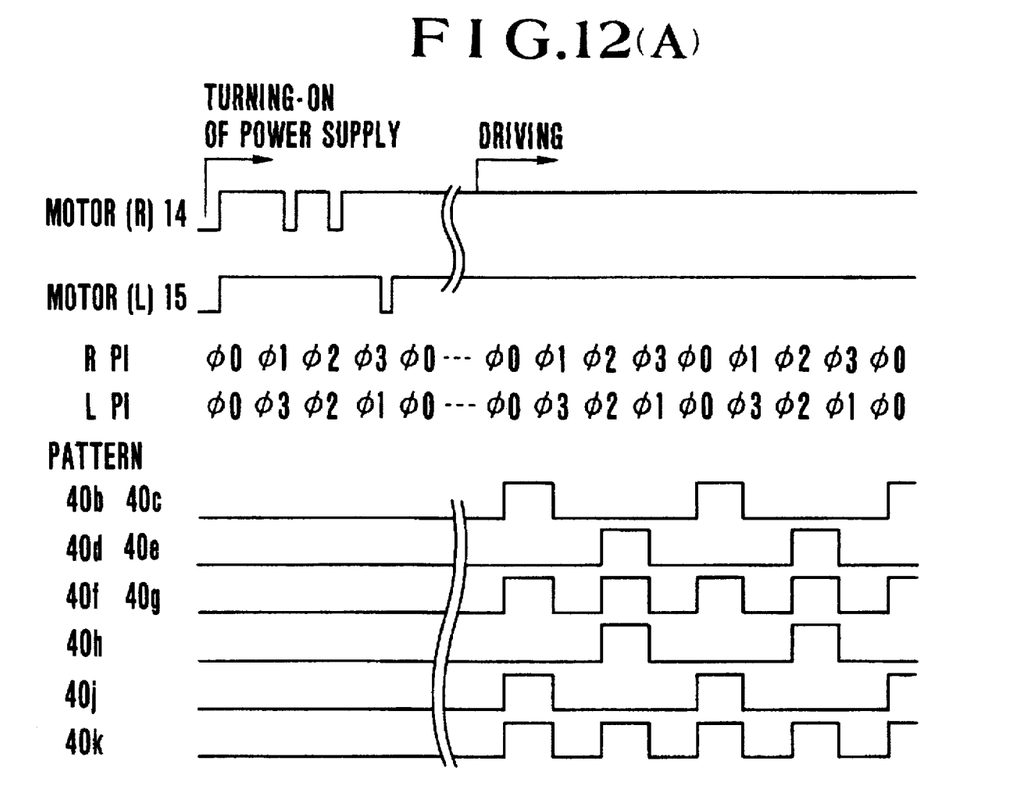
FIGS. 12(A) and 12(B) show the driving timing for a panorama shooting operation of the second embodiment.

An operation of the second embodiment to be performed after the power supply of the camera body is turned on and before a shooting operation is started will be described as follows with reference to FIG. 11 which is a flowchart:

At a step 201, when a main switch of the camera body is turned on with a preparatory action for shooting detected, the motors 14 and 15 start driving. At a step 202, a check is made for a panorama shot mode. If the camera is found to be in the panorama shot mode, the flow of operation comes to a step 204. If not, the flow comes to a step 203 to display a viewfinder field frame and a distance measurement frame. At the step 204, a check is made to find if the photo-taking lens is set on its wide-angle side. If the photo-taking lens is found to be either in a middle-angle position or a telephoto position, the flow comes to the step 203. If the photo-taking lens is found to be in a wide-angle position, the flow comes to a step 205. At the step 205, the zooming position of an objective lens unit 45 of the viewfinder is moved to set the focal length of the viewfinder at a value which is, for example, two times as much as the focal length of the photo-taking lens. This process is intended to make the photographer really feel the magnitude of an object image which would be obtained in a print. Then, the first and second light deflecting means and the segments 40a to 40k of the liquid crystal device 40 which are arranged as shown in FIG. 10 are driven in synchronism, at a driving timing as shown in FIG. 12(A). After that, a shutter release button is pushed with the composition of a picture to be taken decided.

Figure 12B:
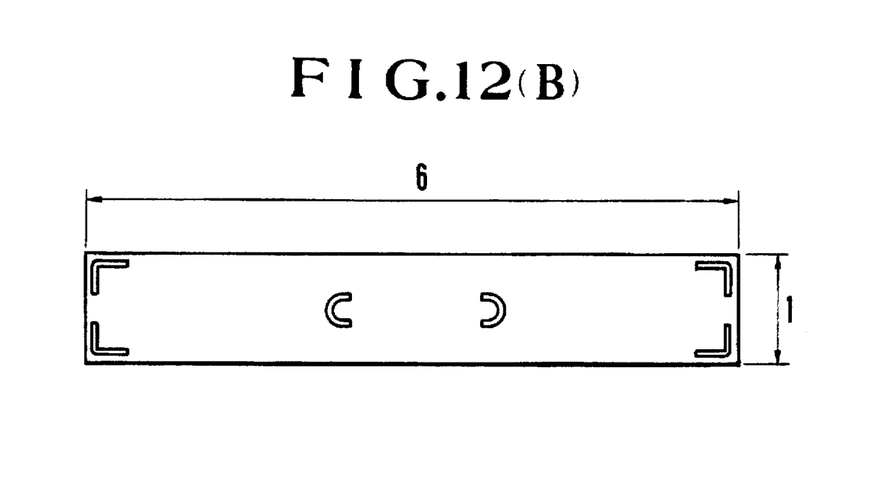

The arrangement described above enables the second embodiment to give a visual field of the viewfinder which is suited for taking a panorama shot of an aspect ratio of 6:1 as shown in FIG. 12(B) with the field magnifying rate nearly doubled. Thus, the photographer is able to really feel the size of a photographed image field which would be obtained in a print.

Figure 13:
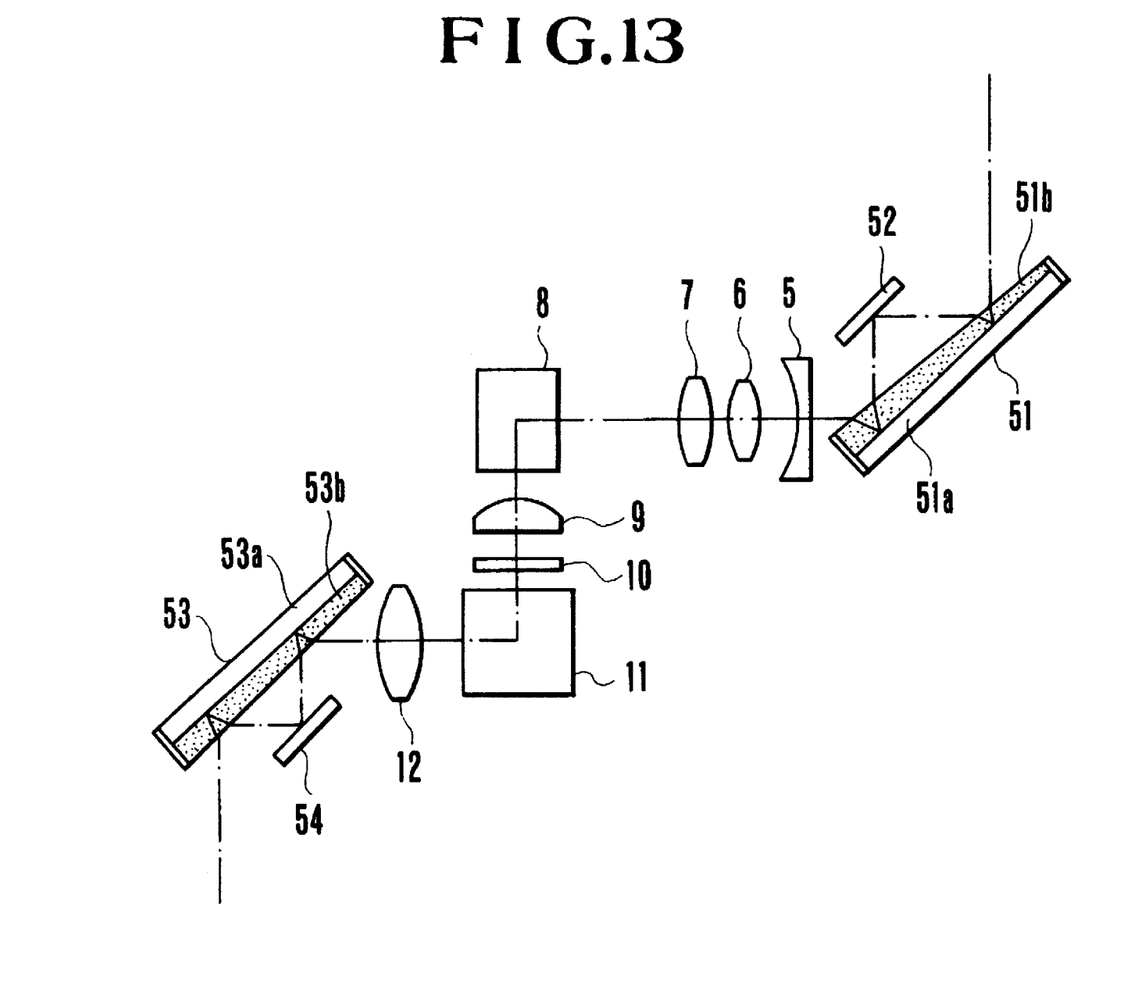
FIG. 13 shows in outline the essential parts of a third embodiment of this invention.

FIG. 13 shows in outline the essential parts of a third embodiment of this invention. This embodiment differs from the first embodiment in that wedges made of PLZT or liquid crystal are used for first and second light deflecting means. With the exception of this point, the third embodiment is arranged in exactly the same manner as the first embodiment which is shown in FIG. 1. In FIG. 13, the same elements as those of FIG. 1 are indicated by the same reference numerals.

Referring to FIG. 13, a first mirror 51 consists of a liquid crystal wedge (or lens) 51b and a mirror part 51a. The deflecting power of the first mirror 51 is variable by applying a voltage to the liquid crystal wedge 51b. The same effect as that attained by swinging a mirror can be attained by varying the deflecting power in this manner. The first mirror 51 is arranged to increase a light flux deflecting angle by reflecting a light flux coming from an object to be photographed to a total reflection mirror 52 and by again reflecting the light flux through the total reflection mirror 52. A second mirror 53 is arranged similarly to the first mirror 51 and guides a light flux passing through an eyepiece lens 12 toward a person taking a sight by twice reflecting the light flux through a total reflection mirror 54.

Like in the case of the first embodiment, the first and second mirrors 51 and 53 are driven in a state of conversely having their phases (the energizing and nonenergizing phases are converse). When a light flux from the right side area of the object is guided by the first mirror 51 to the primary image forming plane, the liquid crystal device 10 which is disposed on the primary image forming plane displays frame patterns 10d and 10e and a distance measurement frame 10h which are shown in FIG. 2. When a light flux from the left side area of the object is guided to the image plane, the liquid crystal device 10 displays frame patterns 10b and 10c and a distance measurement frame 10j.

The third embodiment has no mechanical driving part and drives the liquid crystal wedges at a frequency between 60 and 120 Hz or thereabout. The driving action can be accomplished by relatively easy arrangement. This embodiment is, therefore, suited to a small-sized camera.

In accordance with the disclosed invention, a viewfinder device can be arranged to permit taking a sight with the visual field angle of the viewfinder widened in one direction while allowing each optical element to be in a small size, because, according to the invention, a light flux from the object is deflected with the object area divided by light deflecting means in such a way as to permit use of a single optical path by time-serially dividing it.

Further, the viewfinder device according to the disclosed invention is arranged to be capable of varying the aspect ratio of the visual field of its viewfinder as desired and to increase the magnifying rate of the viewfinder visual field, for example, by two or three times for a panorama shot.

What is claimed is:

1. A viewfinder device, comprising:

a) objective lens means for forming a real image;

b) optical means disposed near the real image, said optical means having a variable light transmittance; and c) a pair of light deflecting means disposed respectively in front and in rear of said objective lens means in an optical path through which light incident on said objective lens means is allowed to pass.

2. A device according to claim 1, wherein said light deflecting means disposed in front of said objective lens means is a reflection mirror arranged to guide light of a left area of a field of view and light of a right area of the field of view alternately to said objective lens means.

3. A device according to claim 1, wherein said pair of light deflecting means are respectively arranged to deflect light in synchronism with each other.

4. A device according to claim 3, wherein said optical means is arranged to vary the light transmittance thereof in synchronism with said pair of light deflecting means.

5. A device according to claim 1, wherein said optical means is arranged to form a visual field frame by varying the light transmittance thereof.

6. A device according to claim 1, wherein said optical means is a liquid crystal device.

7. A viewfinder device comprising:

a) optical lens means;

b) a pair of light deflecting means disposed in front and in rear of said optical lens means; and c) means for varying a light deflecting state of said pair of light deflecting means in such a way as to cause said pair of light deflecting means to alternately guide light of a first area of a field of view and light of a second area of the field of view to an eye of a person taking a sight.

8. A device according to claim 7, wherein said pair of light deflecting means are reflection mirrors.

9. A device according to claim 7, further comprising optical means disposed near a predetermined image forming plane of said optical lens means and having a variable light transmittance.

10. A device according to claim 9, wherein said optical means is a liquid crystal device.

11. A device according to claim 9, wherein said optical means is arranged to vary the light transmittance thereof in synchronism with said means for varying the light deflecting state of said pair of light deflecting means.

12. A finder device comprising:

first means for alternately changing over between a light flux coming from a left side of a field of view and a light flux coming from a right side of the field of view;

optical means for forming an image from the light fluxes;

light restricting means disposed near the image formed by said optical means, said light restricting means being operable in synchronism with the change-over operation of said first means; and second means for changing over optical paths of light beams coming from said light restricting means in synchronism with the change-over operation of said first means.

13. A device according to claim 12, wherein said first means comprises a mirror.

14. A device according to claim 12, wherein said second means comprises a mirror.

* * * * *

UNITED STATES PATENT AND TRADEMARK OFFICE
CERTIFICATE OF CORRECTION

PATENT NO. : 5,682,564
DATED : October 28, 1997
INVENTOR(S) : TAKAYUKI TSUBOI

It is certified that error appears in the above-identified patent and that said Letters Patent is hereby corrected as shown below:

On title page,
<u>At [75] Inventor</u>

"Kanagawa-ken" should read --Yokohama--.

<u>Column 3</u>

Line 45, "realings" should read --real image--.

Signed and Sealed this

Twenty-first Day of April, 1998

Attest:

BRUCE LEHMAN

*Attesting Officer*      *Commissioner of Patents and Trademarks*